US012563301B2

(12) United States Patent
Kato et al.

(10) Patent No.: US 12,563,301 B2
(45) Date of Patent: Feb. 24, 2026

(54) CONTROL APPARATUS, OPTICAL APPARATUS, AND IMAGING APPARATUS ROTATING A FOCAL PLANE AROUND AN AXIS DEFINED BY A FEATURE POINT OF AN OBJECT

(71) Applicant: CANON KABUSHIKI KAISHA, Tokyo (JP)

(72) Inventors: Yuichiro Kato, Tochigi (JP); Masayasu Mizushima, Tochigi (JP); Toshimune Nagano, Saitama (JP); Toru Matsumoto, Tochigi (JP); Akino Moriyoshi, Tochigi (JP); Hiroki Osaka, Tochigi (JP); Yoshiki Saji, Kanagawa (JP); Takami Hirasawa, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 18/675,555

(22) Filed: May 28, 2024

(65) Prior Publication Data

US 2024/0406562 A1      Dec. 5, 2024

(30) Foreign Application Priority Data

May 30, 2023      (JP) ................................. 2023-089101

(51) Int. Cl.
*H04N 5/335*          (2011.01)
*H04N 23/55*          (2023.01)
*H04N 23/611*          (2023.01)
*H04N 23/63*          (2023.01)
*H04N 23/67*          (2023.01)
*H04N 23/695*          (2023.01)

(52) U.S. Cl.
CPC ........... *H04N 23/695* (2023.01); *H04N 23/55* (2023.01); *H04N 23/611* (2023.01); *H04N 23/632* (2023.01); *H04N 23/675* (2023.01)

(58) Field of Classification Search
CPC ..................................................... H04N 23/695
See application file for complete search history.

(56) References Cited

U.S. PATENT DOCUMENTS

| | | | | |
|---|---|---|---|---|
| 2019/0052781 A1* | 2/2019 | Kato | ......................... | G02B 7/04 |
| 2022/0272274 A1* | 8/2022 | Sato | ......................... | G06T 7/70 |

FOREIGN PATENT DOCUMENTS

| | | |
|---|---|---|
| JP | 2019007993 A | 1/2019 |
| JP | 2019090952 A | 6/2019 |
| JP | 2020129788 A | 8/2020 |
| JP | 2020154283 A | 9/2020 |
| JP | 2020205561 A | 12/2020 |

* cited by examiner

*Primary Examiner* — Gary C Vieaux
(74) *Attorney, Agent, or Firm* — ROSSI, KIMMS & McDOWELL LLP

(57) ABSTRACT

A camera system comprising: a lens barrel including a plurality of optical members and configured to image an object; an image pickup unit configured to capture an image formed by the lens barrel; TS driving unit configured to tilt a rotating object plane by driving at least one of a sixth lens unit and an eighth lens unit or the image pickup unit; a focus driving unit configured to drive a second lens unit to change an in-focus position; and a camera CPU configured to recognize a feature point of the object; wherein the rotating object plane is rotatable around an axis defined from the feature point by the TS driving unit.

15 Claims, 10 Drawing Sheets

| MODE | OBJECT | SPOT DETECTION |
|---|---|---|
| Object shot | — | — |
| Person | People | Eyes, Face, Head, Body |
| Vehicle priority | Automobile | Driver, Front |
| | Bike | Rider, Helmet |
| | Train | Cockpit |
| | Airplane | Cockpit |
| | Bicycle | Rider, Helmet |
| Animal priority | Dogs, Cats | Eyes, Face |
| | Birds | Eyes, Face |
| | Horses | Eyes, Face |
| Pattern priority | Person | |
| | Vehicle | |
| | Foods | |
| | Figures | |
| | Diorama | |
| | Building | |
| | Crops | |

CONTROL APPARATUS, OPTICAL APPARATUS, AND IMAGING APPARATUS ROTATING A FOCAL PLANE AROUND AN AXIS DEFINED BY A FEATURE POINT OF AN OBJECT

BACKGROUND OF THE INVENTION

Field of the Invention

The present invention relates to a control apparatus, an optical apparatus, and an imaging apparatus.

Description of the Related Art

Description of the Related Art in recent years, imaging apparatuses such as single-lens reflex cameras have been required to perform imaging for various purposes. As one of them, there is a demand for an image pickup optical system having a so-called tilt effect in which a focal plane is tilted so that an object plane tilted with respect to an optical axis of the image pickup optical system is entirely well focused.

SUMMARY OF THE INVENTION

Japanese Patent Application Laid-Open No. 2019-090952 discloses an optical system which includes a lens portion for generating a tilt effect and a lens portion for generating a shift effect, and which can obtain the tilt effect and the shift effect by driving the two lens portions in a direction perpendicular to the optical axis direction. Japanese Patent Application Laid-Open No. 2019-7993 discloses a camera system in which an optical lens can be adjusted by a focus adjustment unit and a tilt driving unit so that an in-focus area becomes an object.

Since the optical system disclosed in Japanese Patent Application Laid-Open No. 2019-090952 and the camera system disclosed in Japanese Patent Application Laid-Open No. 2019-7993 do not have functions of setting a desired tilting effect and a desired in-focus range for an object to be focused, it is difficult to obtain a desired image.

An object of the present disclosure is to provide a control apparatus, an optical apparatus, and an imaging apparatus capable of setting a desired tilt effect and a desired in-focus range (blurring range).

According to an embodiment of the present disclosure, an imaging apparatus comprising: an optical apparatus including a plurality of optical members and configured to image an object; an image pickup unit configured to captures an image formed by the optical apparatus; a tilt driving unit configured to tilt a focal plane by driving at least one of the plurality of optical members or the image pickup unit, a focus driving unit configured drive another optical member of the plurality of optical members to change an in-focus position, and an object recognition unit configured to recognize a feature point of the object; the focal plane is rotatable around an axis defined from the feature point by the tilt driving unit.

Further features of the present invention will become apparent from the following description of exemplary embodiments with reference to the attached drawings.

BRIEF DESCRIPTION OF THE DRAWINGS

FIG. 6 is a schematic diagram illustrating the object plane (202c).

FIG. 10 is an exemplary listing of shooting modes (301).

DESCRIPTION OF THE EMBODIMENTS

Figure 1:
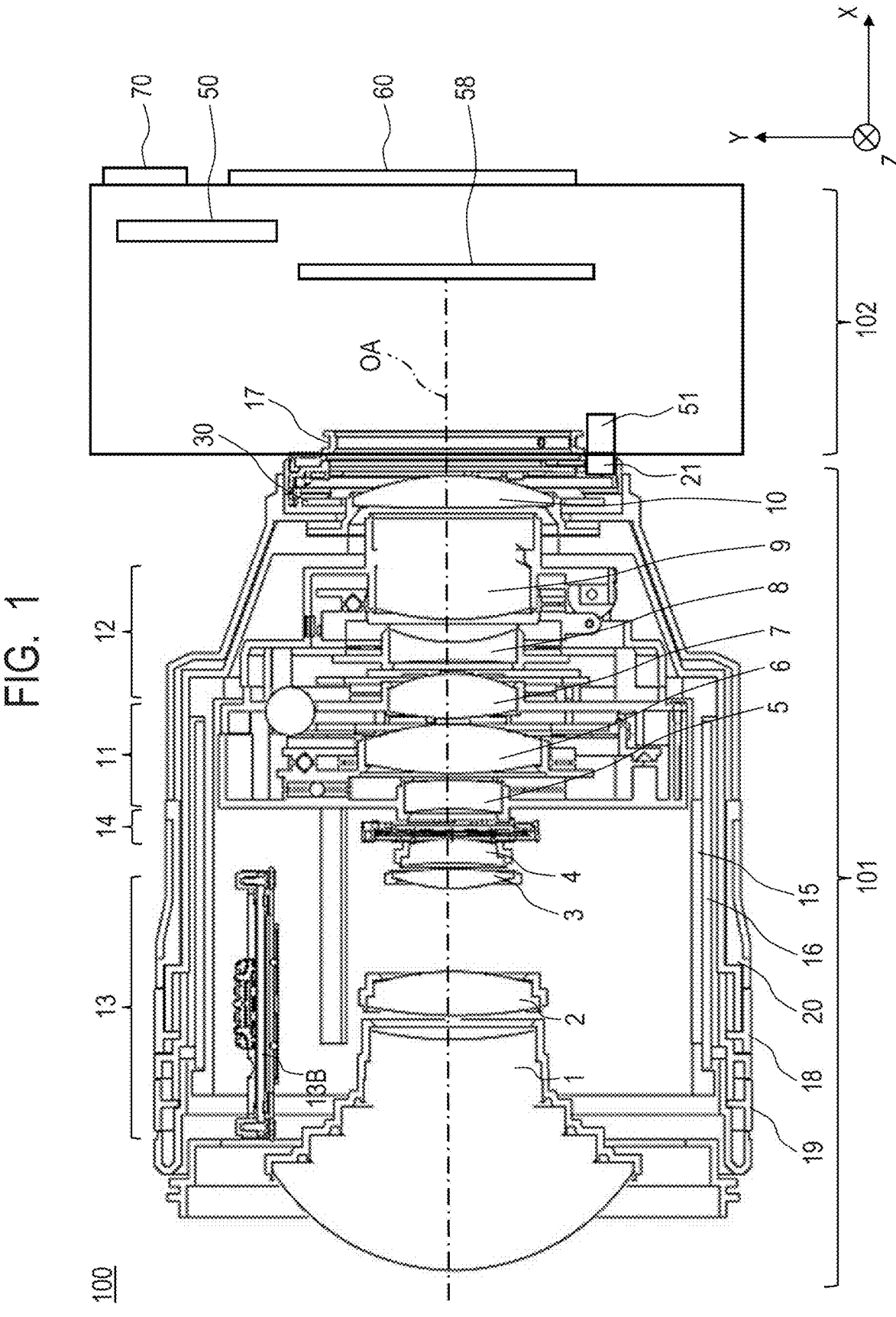
FIG. 1 is a cross-sectional view of a camera system (100) of an embodiment.

Preferred embodiments of the present invention will now be described in detail in accordance with the accompanying drawings. FIG. 1 is a cross-sectional view of a lens barrel 101 (optical apparatus) and a camera body 102 constituting a camera system 100 (imaging apparatus) according to an embodiment of the present disclosure. As illustrated in FIG. 1, the lens barrel 101 of the present embodiment is configured to be detachably attached to an image pickup unit 58 (image pickup element) of the camera body 102, but the camera body 102 and the lens barrel 101 may be integrally configured. In the drawings, A direction along the optical axis OA in the lens barrel 101 is defined as an X-axis direction, a pitch direction is defined as a Y-axis direction, and a yaw direction is defined as a Z-axis direction.

The camera body 102 includes the image pickup unit 58 that captures an image formed by the lens barrel 101. An image formed through the lens barrel 101 can be exposed to the image pickup unit 58 for an arbitrary time by controlling a shutter (not illustrated) by the camera CPU 50 and can be captured. The camera system 100 also includes a display unit 60 (notification unit) as a touch panel having a touch panel function capable of displaying a captured image and changing various settings of the camera system 100, and a finder 70 capable of checking a captured image and inputting a line of sight by looking into the finder 70.

The lens barrel 101 includes a first lens unit 1, a second lens unit 2 (another optical member), a third lens unit 3, a fourth lens unit 4, a fifth lens unit 5, a sixth lens unit 6 (optical member), a seventh lens unit 7, an eighth lens unit 8 (optical member), a ninth lens unit 9, and a tenth lens unit 10. The optical system including these lens units have an optical axis OA. The focal length of the optical system is changed by changing the positional relationship of each lens unit in the optical axis OA direction. The lens barrel 101 includes a diaphragm mechanism 14 that changes the aperture diameter of the optical system by a lens CPU 30. The lens barrel 101 forms an image of an object passing through each lens unit on the image pickup unit 58.

Each lens unit is held by a lens barrel having a cam follower, and the cam follower is engaged with a straight groove parallel to the optical axis OA of the guide barrel 15 and a groove inclined with respect to the optical axis OA of the cam barrel 16. The cam barrel 16 is engaged with the zoom operation ring 20, and when the zoom operation ring 20 rotates, the cam barrel 16 rotates, so that the focal length can be changed by rotating the zoom operation ring 20. In addition, the focal length of the optical system can be detected by a zoom position detector (zoom operation ring rotation detector 20A) (not illustrated) that detects the rotation amount of the zoom operation ring 20.

The second lens unit 2 is a focusing unit that can adjust focus by being driven in the optical axis OA direction. A focusing unit 13 is constituted by a guide bar (not illustrated) that guides the second lens unit 2 in the optical axis OA direction, a focus driver 13A (vibration actuators) that drives the second lens unit 2, and a focus position detector (not illustrated) that detects a movement amount of the second lens unit 2. The focusing unit 13 is driven and controlled by the lens CPU 30.

By driving each or at least one of the sixth lens unit 6 and the eighth lens unit 8 in a direction orthogonal to the optical axis OA, a tilt effect of tilting a focal plane with respect to an imaging plane and a shift effect of moving an image pickup area (angle of view) can be obtained. That is, each of the sixth lens unit 6 and the eighth lens unit 8 is a shift optical member configured to be movable in a direction orthogonal to the optical axis OA. Specifically, a case where both the sixth lens unit 6 and the eighth lens unit 8 have a positive refractive power or a negative refractive power, a tilt effect can be obtained by moving the sixth lens unit 6 and the eighth lens unit 8 in opposite directions in a direction orthogonal to the optical axis OA. And a shift effect can be obtained by moving the sixth lens unit 6 and the eighth lens unit 8 in the same direction. In the case where the sixth lens unit 6 and the eighth lens unit 8 have different positive and negative refractive powers, a shift effect can be obtained by moving the sixth lens unit 6 and the eighth lens unit 8 in opposite directions, and a tilt effect can be obtained by moving the sixth lens unit 6 and the eighth lens unit 8 in the same direction. A first shift unit 11 is constituted by a holding means that that holds the lens movably in a direction perpendicular to the optical axis OA, a driving means, and a shift position detector (not illustrated) that detects a movement distance, the sixth lens unit 6 is driven. And a second shift unit 12 is constituted in the same manner, and the eighth lens unit 8 is driven. At this time, the first shift unit 11 and the second shift unit 12 are driven and controlled by the lens CPU 30.

The driving means of the present embodiment uses a stepping motor as a driving source. However, as long as the actuator can drive the sixth lens unit 6 and the eighth lens unit 8, for example, a voice coil motor (VCM) may be used, and the present invention is not limited thereto. Here, depending on the optical system, it is possible to obtain a tilt effect by tilting (rotating) a so-called lens, but in the optical system of the present embodiment, the lens is driven in a direction orthogonal to the optical axis OA.

The lens barrel 101 is provided with a mount 17, and the mount 17 is connected to a camera side mount (not illustrated) of the camera body 102, so that the lens barrel 101 can be fixed. Further, the lens barrel 101 and the camera body 102 have lens-side electrical contacts 21 and camera-side electrical contacts 51 for connecting the lens CPU 30 and the camera CPU 50, respectively, so that setting items set on the camera body 102 side can be reflected on the lens barrel 101.

Figure 2:
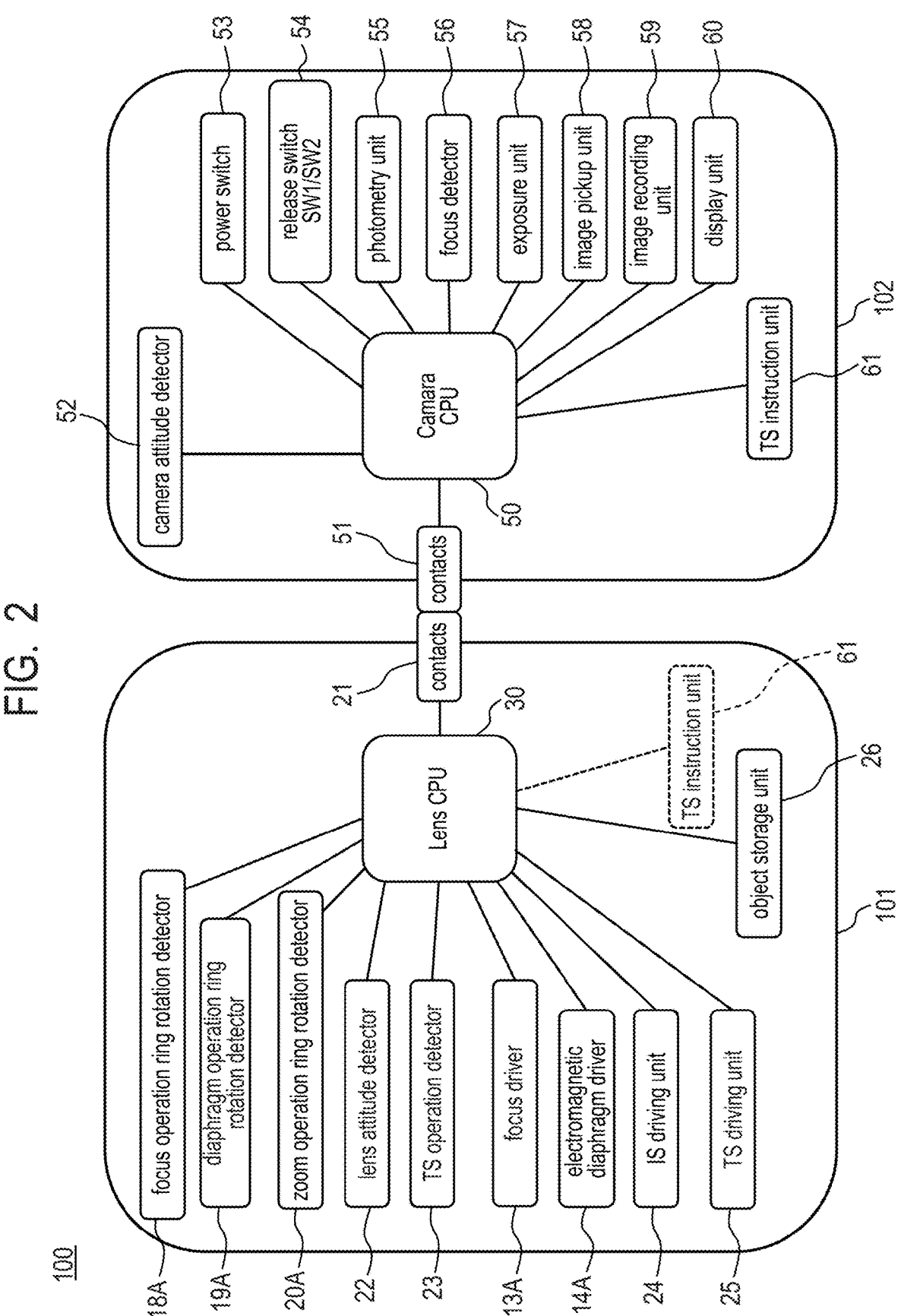
FIG. 2 is a schematic diagram of the camera system (100) of the embodiment.

FIG. 2 is an electrical configuration diagram of the camera system 100 including the lens barrel 101 and the camera body 102 according to the embodiment. At first, the control in the camera body 102 will be described. The camera CPU 50 is constituted by a microcomputer. The camera CPU 50 controls the operation of each unit in the camera body 102. And when the lens barrel 101 is mounted, the camera CPU 50 communicates with a lens CPU 30 provided in the lens barrel 101 via the lens-side electrical contacts 21 and the camera-side electrical contacts 51.

The information (signal) transmitted from the camera CPU 50 to the lens CPU 30 includes driving amount information of the second lens unit 2, defocus information, a diaphragm driving command, and attitude information of the camera body 102 based on a signal from a camera attitude detector 52 such as an accelerometer. In addition, object distance information and position information of an object based on a signal from TS instruction unit 61 instructing a desired object on which the photographer wants to focus, image pickup area information instructing a desired image pickup area (field of view), and the like are included. Details of the TS instruction unit 61 will be described later.

The information (signal) transmitted from the lens CPU 30 to the camera CPU 50 includes optical information such as an imaging magnification of the lens barrel 101 and lens functional information such as zoom and stabilization mounted on the mounted lens barrel 101. In addition, attitude information from a lens attitude detector 22 such as a gyro sensor or an acceleration sensor is also included.

Note that the lens-side electrical contacts 21 and the camera-side electrical contacts 51 include contacts for supplying power from the camera body 102 to the lens barrel 101.

A power switch 53 is a switch that can be operated by the photographer, and can activate the camera CPU 50 and start supplying power to actuators, sensors, and the like in the camera system 100. A release switch 54 is a switch that can be operated by the photographer, and has a first stroke switch SW1 and a second stroke switch SW2. A signal from the release switch 54 is input to the camera CPU 50. The camera CPU 50 enters a ready-to-photograph state in response to input of the ON signal from the first stroke switch SW1. In the photographing preparation state, measurement of object brightness by a photometry unit 55 and focus detection by a focus detector 56 are performed.

The camera CPU 50 calculates an aperture value of the diaphragm mechanism 14, an exposure amount (shutter speed) of the image pickup unit 58, and the like based on a photometry result by the photometry unit 55. Further, the camera CPU 50 determines driving amount information (driving direction, in-focus position) of the second lens unit 2 for obtaining an in-focus state with respect to the object based on focus information (defocus amount and defocus direction) which is a detection result of the focus state of the imaging optical system by the focus detector 56. The driving amount information of the second lens unit 2 is transmitted to the lens CPU 30. The lens CPU 30 controls the operation of each component of the lens barrel 101.

In addition, in the lens barrel 101 of the present embodiment, by driving each or at least one of the sixth lens unit 6 and the eighth lens unit 8 in a direction orthogonal to the optical axis OA, a tilt effect of tilting the focal plane with respect to the imaging plane or a shift effect of moving the image pickup area can be obtained. Therefore, the camera CPU 50 calculates a tilt-driving amount for focusing on a desired object instructed by the TS instruction unit 61. In addition, a shift driving amount for changing the current image pickup area to the image pickup area instructed by the TS instruction unit 61 is calculated. Information on these driving amounts is transmitted from the camera CPU 50 to the lens CPU 30, and driving of the sixth lens unit 6 and the eighth lens unit 8 is controlled.

Here, a plurality of objects may be instructed by the TS instruction unit 61. Even if there are a plurality of objects at different distances, it is possible to perform focusing if there is at least one object on an object plane 202*b* (see FIG. 3B) inclined by the above-described tilting effect. Details of photographing using the tilt effect by the tilt operation will be described later.

In addition, the TS instruction unit 61 may be provided in the lens barrel 101 instead of the camera body 102, and the function of the TS instruction unit 61 may be assigned to an existing rotation operation unit, a button switch, or the like of the lens barrel 101 or the camera body 102. In addition, although it is possible to prepare a dedicated TS instruction unit 61 in the lens barrel 101 or the camera body 102, description of the configuration thereof will be omitted.

Further, when the camera CPU 50 enters a predetermined shooting mode, the camera CPU 50 starts eccentric driving of an image stabilization lens (not illustrated), that is, control of an image stabilization operation. When there is no image stabilization function, the eccentric driving of the image stabilization lens is unnecessary.

When an ON signal is input from the second stroke switch SW2 of the release switch 54, the camera CPU 50 transmits an aperture drive command to the lens CPU 30, and the diaphragm mechanism 14 is set to the previously calculated aperture value. In addition, the camera CPU 50 transmits an exposure start command to an exposure unit 57 to perform a mirror retraction operation (not illustrated) (this operation is not performed in a mirrorless camera) or a shutter opening operation (not illustrated), the image pickup element of the image pickup unit 58 performs photoelectric conversion of the object image, that is, an exposure operation is performed.

An image pickup signal from the image pickup unit 58 is converted into a digital signal by a signal processing unit in the camera CPU 50, further various correction processes are performed, and output as an image signal. The image signal (data) is recorded and stored in a recording medium such as a semiconductor memory such as a flash memory, a magnetic disk, or an optical disk in an image recording unit 59. In addition, an image captured by the image pickup unit 58 at the time of photographing or an image recorded in the image recording unit 59 can be displayed on the display unit 60 which is a display using a liquid crystal or organic EL technology. In recent years, a touch operation technique is mounted on the display, and an object can be selected and focused on the display for live view imaging. A configuration in which the TS instruction unit 61 is included in the display unit 60 is mainstream.

Next, the control in the lens barrel 101 will be described. The first shift unit 11, the second shift unit 12, the focusing unit 13, and the diaphragm mechanism 14 are electrically connected to a lens CPU 30 of the lens barrel 101.

A focus operation ring rotation detector 18A includes a sensor (not illustrated) that detects the rotation of the focus operation ring 18. A diaphragm operation ring rotation detector 19A includes a sensor (not illustrated) that detects the rotation of a diaphragm operation ring 19. The zoom operation ring rotation detector 20A includes a sensor (not illustrated) that detects the rotation of the zoom operation ring 20.

Although not illustrated in FIG. 1, the lens attitude detector 22 is disposed and fixed inside the lens barrel 101, and is electrically connected to the lens CPU 30. The gyro sensor detects an angular speed of each of a vertical (pitch direction) shake and a horizontal (yaw direction) shake which are angular shakes of the camera system 100, and outputs a detection value to the lens CPU 30 as an angular speed signal. The lens CPU 30 electrically or mechanically integrates angular speed signals in the pitch direction and the yaw direction from the gyro sensor, and calculates a pitch direction shake amount and a yaw direction shake amount (collectively referred to as an angular shake amount) which are displacements in the respective directions.

A TS operation detector 23 includes a manual operation unit (control change unit) for preparing for obtaining tilt and shift effects and a sensor (not illustrated) for detecting the operation amount of the manual operation unit. That is, the TS operation detector 23 detects a manual operation amount when the sixth lens unit 6 and the eighth lens unit 8 are driven in a direction orthogonal to the optical axis OA by using a sensor.

Next, each driving unit will be described. The focus driver 13A of the focusing unit 13 drives the second lens unit 2 in the direction of the optical axis OA according to the driving amount information of the second lens unit 2 that performs the focusing operation. The driving amount information is determined based on a signal from the camera CPU 50. Alternatively, the rotation of the manually operated focus operation ring 18 may be detected by the focus operation ring rotation detector 18A, and the driving amount information may be determined from the signal instructing the focus position manually.

An electromagnetic diaphragm driver 14A of the diaphragm mechanism 14 is controlled by the lens CPU 30 that has received a diaphragm drive command from the camera CPU 50, and drives the diaphragm mechanism 14 to an aperture state corresponding to an instructed aperture value. When the photographer instructs a desired aperture value by operating the diaphragm operation ring 19, the lens barrel is driven in the same manner.

An IS driving unit 24 includes a driving actuator of an image stabilization lens (not illustrated) which performs an image stabilization, and a driving circuit thereof. If there is no image stabilization function, this configuration is not necessary. The lens CPU 30 controls the IS driving unit 24 based on the above-described combined shift amount of the angular shake amount and the parallel shake amount to shift and drive the image stabilization lens (not illustrated), thereby performing angular shake correction and parallel shake correction. As described above, if there is no image stabilization function, this configuration/function is unnecessary. Further, the lens CPU 30 controls the focus driver 13A based on the focus shake amount to drive the second lens unit 2 in the optical axis direction, thereby performing focus shake correction. The focus driver 13A drives at least one second lens unit 2 to change the in-focus position.

A TS driving unit 25 (tilt driving unit) receives object distance information, position information, and image pickup area information from the camera CPU 50, performs a tilt operation so as to obtain a desired inclined focal plane (object plane 202*b*, FIG. 3B), and performs a shift operation so as to obtain a desired image pickup area. That is, the TS driving unit 25 tilts the focal plane with respect to the imaging plane by driving each or at least one of the sixth lens unit 6 and the eighth lens unit 8, which are a plurality of optical members, in a direction orthogonal to the optical axis OA. Alternatively, the TS driving unit 25 drives the image pickup unit 58 to tilt the focal plane. Here, to obtain a desired focus, it is goes without saying that the TS driving unit 25 or the TS driving unit 25 and the focus driver 13A are controlled by the lens CPU 30 so as to optimally operate. The lens barrel 101 according to the present exemplary embodiment has an optical characteristic in which the focus is changed even when the object distance is not changed by the shift operation. However, it goes without saying that the TS driving unit 25 and the focus driver 13A are optimally controlled in accordance with the characteristics.

Here, in the lens barrel 101 of the present embodiment, the lens CPU 30 controls the TS driving unit 25 based on the amount of shake and shift of the lens barrel 101 calculated based on the output from the lens attitude detector 22. For example, in a case where camera shake occurs when photographing is performed by holding the camera system 100 with a hand, the object plane is shifted with respect to the object. However, in the camera system 100 according to the present embodiment, since the position of the object is stored in an object storage unit 26, which will be described later, it is possible to control the TS driving unit 25 to continuously adjust the object plane to the object by correcting the camera shake. To control the TS driving unit 25, a signal from an acceleration sensor mounted on the camera body 102 may be used. Note that not only the gyro sensor but also an acceleration sensor may be mounted on the lens barrel 101.

The object storage unit 26 stores the spatial position in the image pickup area of the object instructed by the TS instruction unit 61 or the display unit 60. This position can be defined by the object distance and the coordinates (X, Y) of the imaging plane as an X-Y axis plane, which will be described in detail later.

Figure 3A:
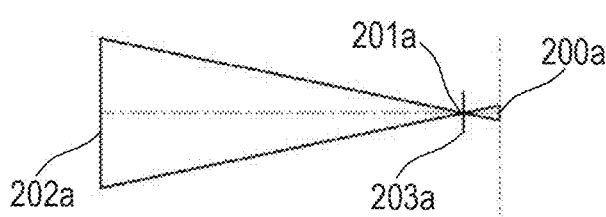
FIG. 3A is a diagram illustrating an in-focus range.
Figure 3B:
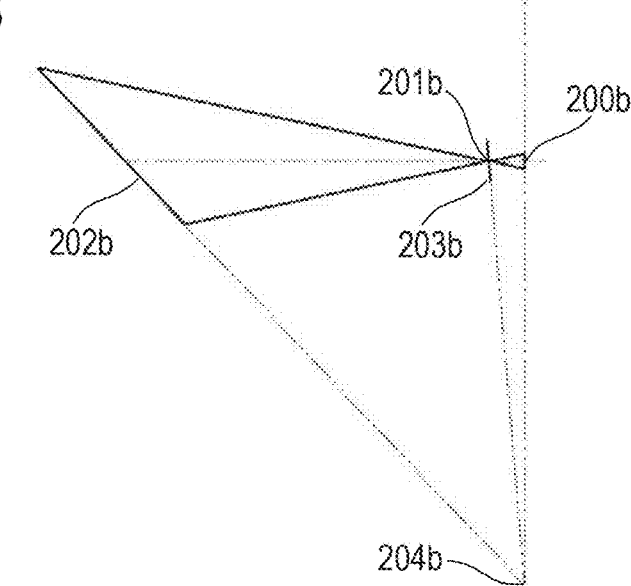
FIG. 3B is a diagram illustrating the principle of Scheimpflug.

Next, the principle of Scheimpflug will be described. FIG. 3A illustrates a so-called normal in-focus range when the optical axis OA of an optical system 201a is not inclined with respect to an imaging plane 200a. FIG. 3B illustrates the in-focus range based on the Scheimpflug principle when the optical axis OA of an imaging plane 200b is inclined with respect to an optical system 201b.

In the drawing, the imaging plane 200a, the imaging plane 200b, the optical system 201a, the optical system 201b, an in-focus object plane 202a, an in-focus object plane 202b, a principal plane 203a of the optical system, and a principal plane 203b are illustrated. As illustrated in FIG. 3B, when the optical axis OA of the optical system in the lens barrel 101 and the image pickup unit 58 are inclined, the in-focus range on the object side is determined by the Scheimpflug principle. The Scheimpflug principle is that, when an extension of a line tangent to the imaging plane 200b and an extension of a line tangent to the principal plane 203b of the optical system intersect at an intersection point 204b, an extension of a line tangent to the object plane 202b also passes through the intersection point 204b.

When an object to be photographed has a depth, the object can be focused from the front to the back of the object by inclining the object plane 202b along the depth. When it is desired to focus on a depth portion with a lens that does not have a tilt-shift mechanism, a method of deepening a depth of field by narrowing the aperture is common, but with a tilt-shift lens, even if the aperture is open, it is possible to focus in accordance with that depth by performing a tilt operation.

On the contrary, by tilting the principal plane 203b of the optical system 201b in a direction opposite to an inclination of the object having a depth, the object plane 202b can be made to intersect the depth direction of the object at an angle close to a right angle. In this case, since the in-focus range can be extremely narrowed, a dioramic image can be obtained.

Figure 3C:
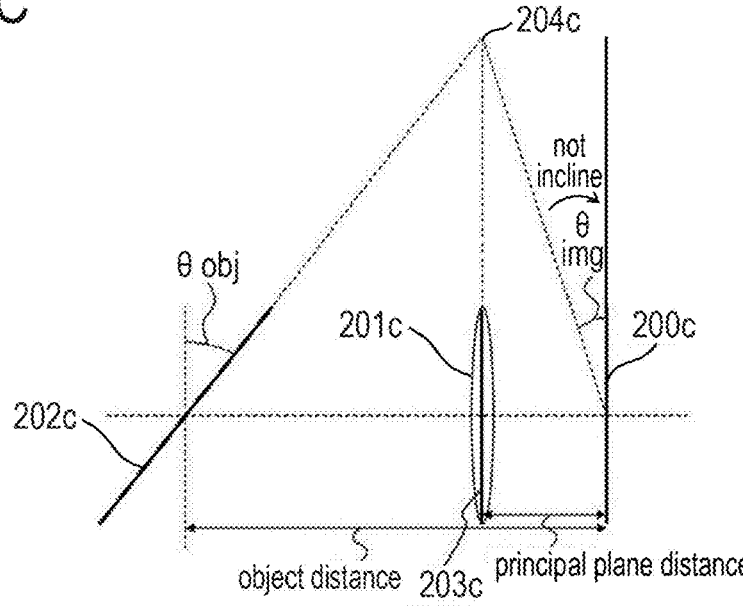
FIG. 3C is a view illustrating that the Scheimpflug principle is applied in the embodiment.

FIG. 3C is a diagram illustrating the inclination of an object plane 202c and an imaging plane 200c of the present disclosure to which the Scheimpflug principle is applied. In the present embodiment, an inclination Oobj of an object plane 202c is generated not by the method of inclining an optical system 201c but by utilizing an image plane inclination by decentering the optical elements. However, when the Scheimpflug principle is applied to a principal plane 203c of the optical system 201c and the object plane 202c in which the inclination does not occur, the image plane inclination of an angle θimg should occur in an imaging plane 200c. Therefore, the angle θimg is corrected by the eccentricity of the optical system 201c, and the imaging plane 200c is tilted without tilting the object plane 202c, so that a desired object can be focused. With this configuration, an extension line of a line inclined at the angle θimg from the imaging plane 200c and an extension line of the principal plane 203c of the optical system intersect at an intersection point 204c, and an extension line of a line in contact with the object plane 202c also passes through the intersection point 204c. Therefore, it can be seen that the Scheimpflug principle is applied.

On the other hand, when a predetermined imaging plane tilt correction effect is to be secured, the eccentricity amount of the optical system 201c increases, and the composition deviation increases. Therefore, the other lens designed to reduce an aberration variation at the time of decentering is moved so as not to increase the composition deviation. That is, in the present embodiment, at least one of the sixth lens unit 6 and the eighth lens unit 8 corresponding to the optical system 201c is eccentrically operated to solve the problem that the composition deviation increases.

Figure 4:
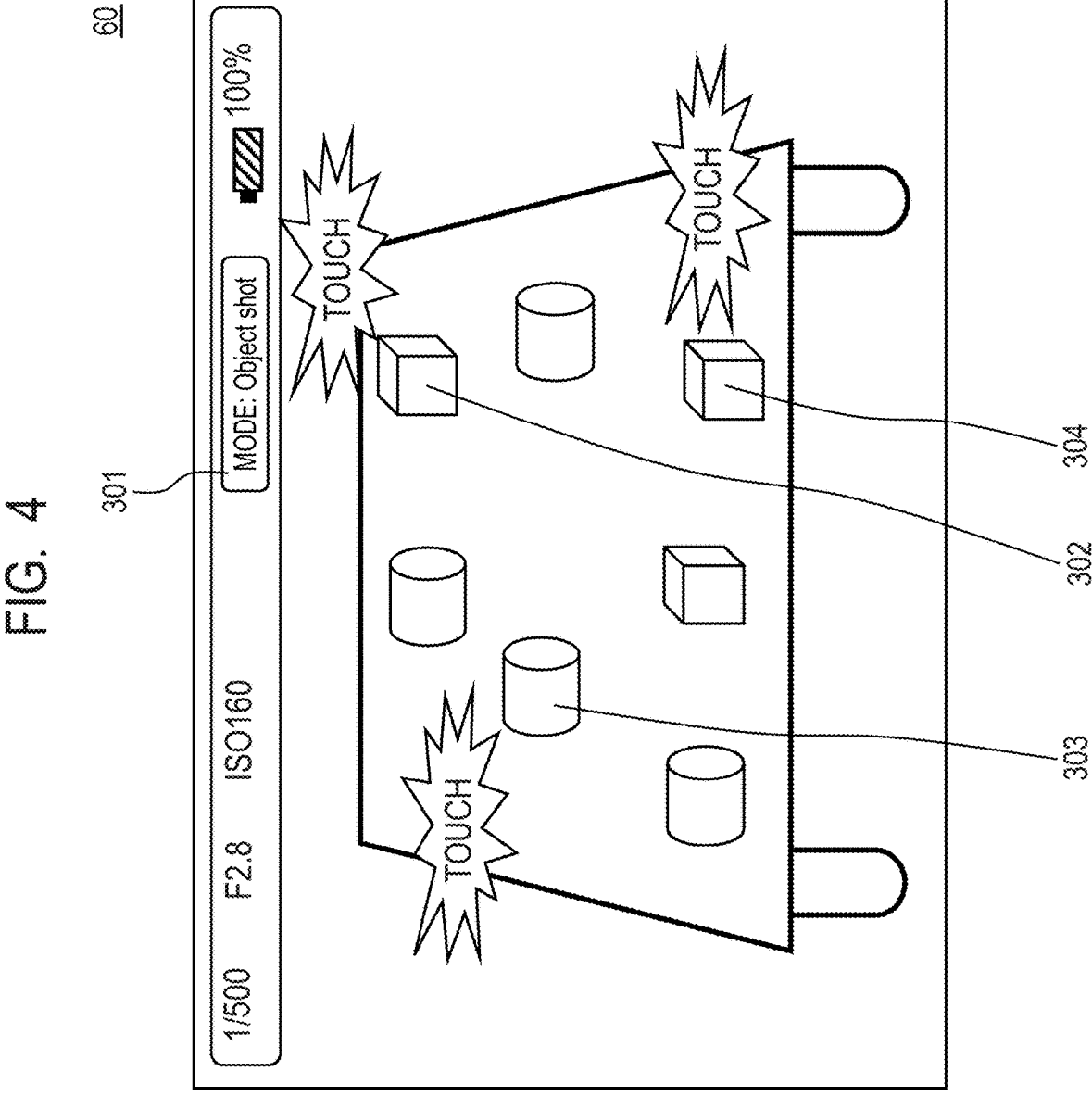
FIG. 4 is a schematic diagram of the display unit (60) in the case where the tilt effect is used at the time of photographing.

Here, photographing using the tilt effect in this embodiment will be described. FIG. 4 is a schematic diagram of the display unit 60 installed on the rear surface of the camera body 102 in the case where the tilt effect is used at the time of photographing. The display unit 60 is a monitor, and is also the TS instruction unit 61 by a touch panel function. Objects 302, 303, and 304 displayed on the display unit 60 are, for example, food, accessories, and the like placed on a table, and a so-called "object shot" is assumed as a shooting scene. These objects 302, 303, and 304 have different shooting distances, but photographing in which all of the objects 302, 303, and 304 are brought into focus, that is, so-called "tilt photographing" can be performed. Therefore, in the camera system 100 according to the present exemplary embodiment, the photographer touches and instructs an object to be focused on the display unit 60. Then, the sixth lens unit 6 and the eighth lens unit 8 are controlled by the camera CPU 50 and the lens CPU 30 in the above-described camera system 100, so that the object plane (focal plane) is tilted, and all the desired objects can be focused.

Next, with reference to FIGS. 5 to 9, how the camera CPU 50 and the lens CPU 30 perform calculations, and how the sixth lens unit 6 and the eighth lens unit 8 are controlled to construct the object plane will be described in detail.

Figure 5:
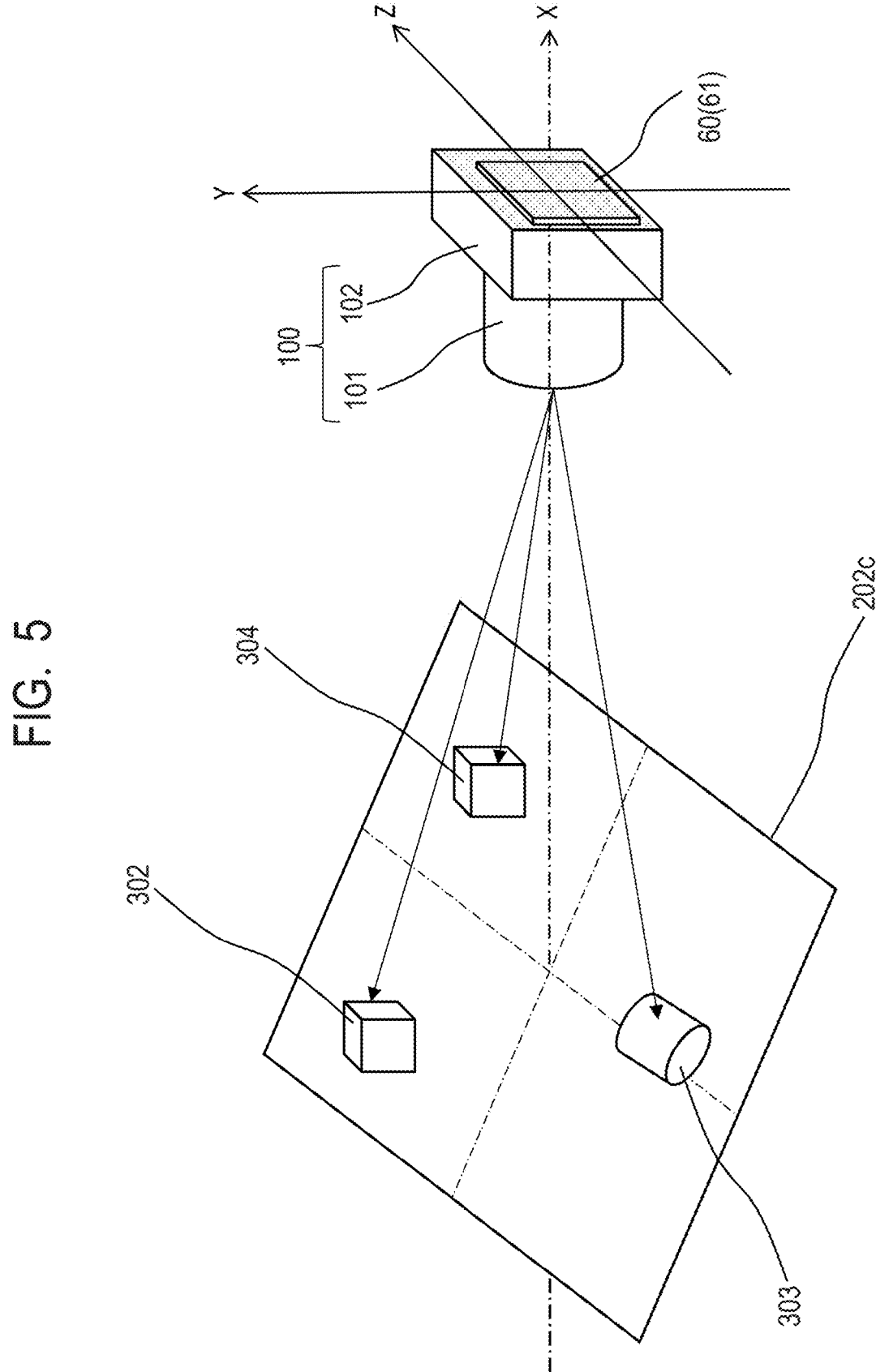
FIG. 5 is a perspective view of the object plane (202c) in a space with the camera system (100) as the origin.

FIG. 5 is a perspective view of the object plane 202c in a space with the camera body 102 of the camera system 100 as the origin. The origin in the camera system 100 of the present embodiment is the center of the image pickup unit 58, the camera horizontal direction of the surface thereof is the Z direction, the vertical direction is the Y direction, and the optical axis direction is the X direction.

The camera system 100 can acquire position information of the objects 302, 303, and 304 in the X direction by, for example, a ranging system (not illustrated) using infrared light, or a ranging function mounted on the image pickup unit 58. Further, position information in the Z direction and the Y direction can be acquired depending on at which position of the image pickup unit 58, the images of the objects 302, 303, and 304 are formed. Note that the position in the space varies depending on the focal length of the optical system, but the position information takes this into account.

Therefore, as described above, when the photographer instructs the plurality of objects 302, 303, and 304 by the touch operation, the camera system 100 can acquire the coordinate information of each object in the space. The acquired coordinate information is stored in the object storage unit 26, such as a memory, which stores the object position. A memory (not illustrated) mounted on the lens barrel 101 according to this embodiment stores a sensitivity table indicating how the object plane 202c tilts with respect to the optical axis OA when the sixth lens unit 6 and the eighth lens unit 8 are displaced by how many millimeters and in which direction.

The camera CPU 50 and the lens CPU 30 calculates based on the stored information of the coordinates and the sensitivity, based on the calculation result, the sixth lens unit 6 and the eighth lens unit 8 can be controlled to align the object plane 202c with the spatial coordinates of the objects 302, 303, and 304. Instead of the sensitivity table, for example, the amount of lens movement and the amount of tilt of the object plane 202c may be calculated by a predetermined calculation formula, and the sixth lens unit 6 and the eighth lens unit 8 may be controlled based on the calculation result. There is also a method of constructing the object plane 202c by gradually moving the sixth lens unit 6 and the eighth lens unit 8 and determining the focusing level of each object. The control method is not limited as long as it is appropriate for the camera system 100.

Figure 6:
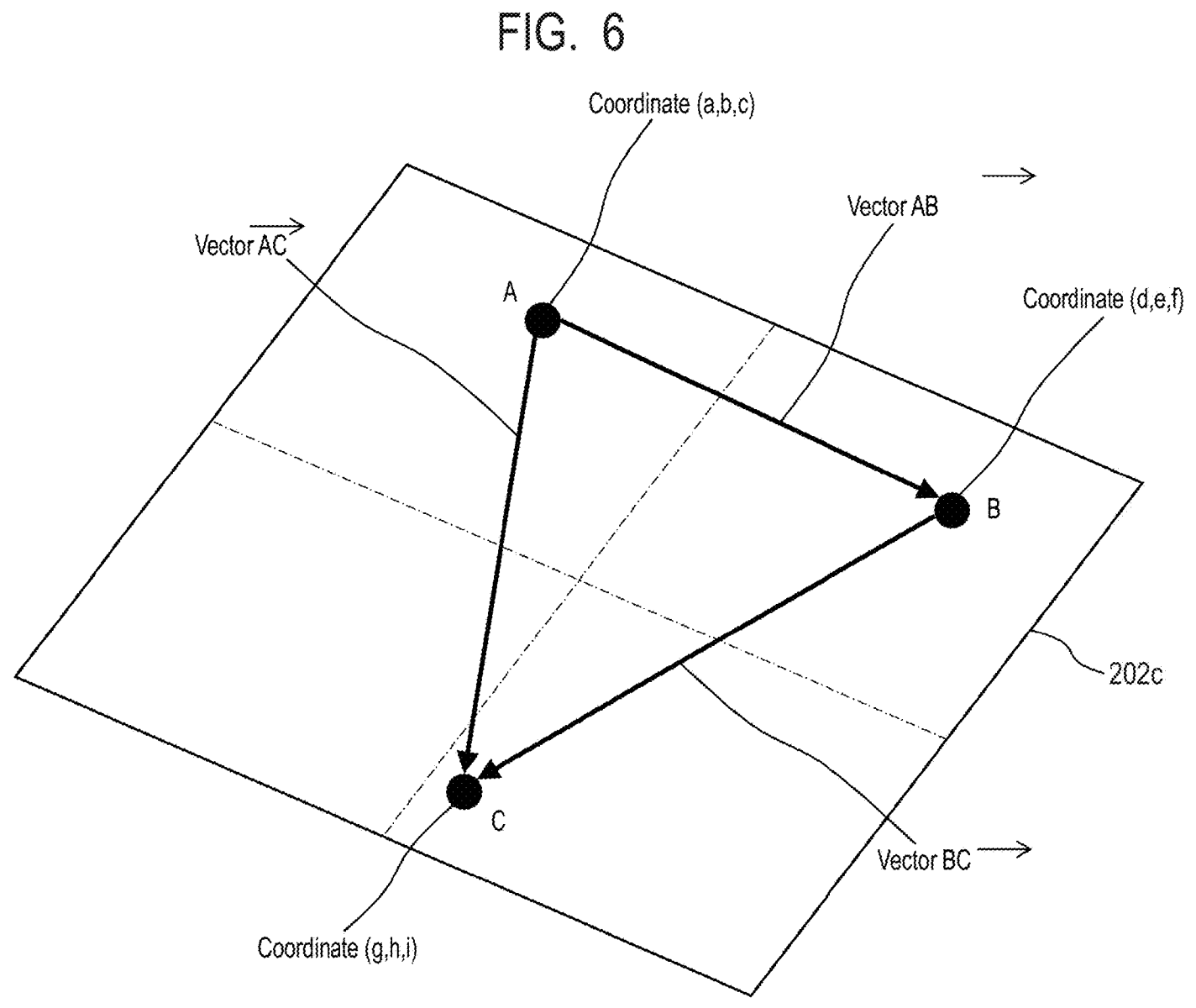

In FIG. 5, the method of constructing the object plane 202c by instructs the three spatial coordinates of the objects 302, 303, and 304 has been described. However, when the object plane 202c is regarded as a plane in a three dimensional space, there are methods other than determining three points for mathematically defining the space plane. The object plane 202c can also be constructed by utilizing the calculation formula for the control calculation of the camera system 100, and these methods will be described below with reference to FIG. 6. FIG. 6 is a schematic diagram illustrating the object plane 202c.

In FIG. 6, spatial coordinate points A, B, and C illustrating the indicated object position are illustrated, and vectors AB, AC, and BC that can be defined by the spatial coordinate points A, B, and C are illustrated. Here, the mathematical condition of the object plane 202c which is a plane is as follows.

(1) "Plane passing through three points not on the same straight line"

(2) "Plane including one straight line (vector) and passing through one point not on the straight line"

(3) "Plane in which one point through which a plane passes and a straight line (vector) orthogonal to the plane are instructed"

(4) "Plane including two straight lines (vectors) parallel to each other or intersecting at one point"

If the three spatial coordinate points A, B, and C are determined so as to satisfy one of these conditions, the plane can be mathematically defined. In this embodiment, it is possible to control the object plane 202c to be aligned with the plane.

The expression of the plane of the object plane 202c is as follows.

Spatial coordinate point A=(a, b, c).
Spatial coordinate point B=(d, e, f).
Spatial coordinate point C=(g, h, I).

10

Where $$\text{Vector } AB = (d-a,\ e-b,\ f-c)$$

$$\text{Vector } AC = (g-a,\ h-b,\ i-c)$$

above defined, and the cross product of the normal vector of these vectors is calculated.

$$\text{Vector } AB \times \text{vector } AC = (p, q, r)$$

$$p = (e-b)(i-c) - (h-b)(f-c)$$

$$q = (f-c)(g-a) - (i-c)(d-a)$$

$$r = (d-a)(h-b) - (g-a)(e-b)$$

$$s = -(pa + qb + rc)$$

And the equation of the object plane 202c is px+qy+rz+s=0.

That is, the normal vector of the plane is calculated by the cross product of the vector AB and the vector AC by the three spatial coordinate points A, B, and C, and the components of the normal vector become the coefficients of x, y, and z. Then, the coordinate of the spatial coordinate point A on the plane is substituted to calculate the constants, and as a result, the above equation is obtained.

Considering another condition, for example, there is a method of determining the vector AB and the spatial coordinate points A, B, and C in accordance with the condition (2). In this case, the photographer does not only touch and instructs three objects on the display unit 60. There is also a method in which the vector as the rotation axis of the object plane 202c is indicated by an operation method such as a so-called "swipe" or "flick" in which a finger is slid on the display unit 60, and the spatial coordinate point B is indicated and defined as a plane.

There is also a method of instructing two vectors by "swipe" in accordance with the condition (4), for example, instructing the vectors AB and AC in FIG. 6. Note that not only the vectors based on the spatial coordinate points A, B, and C illustrated in FIG. 6, but also other vectors may be instructed. In the calculation, it is a condition that these vectors are parallel to each other or two vectors intersect at one point. However, the instruction on the display unit 60 is performed on the plane. Therefore, when a vector is instructed, a method of determining the X direction (depth direction) so as to connect two points of the first touched object and the object from which the finger is separated is considered. Details of such an object instruction method will be omitted.

In addition to the touch instruction of the display unit 60 described above, there is a method of instructing each spatial coordinate point or each vector. For example, the line of sight input using an EVF, a rotation operation of the diaphragm operation ring 19, or a method using a button or a dial (not illustrated) may be used. In the present embodiment, all of them will not be listed, but the instruction method is not limited. Any method may be used as long as a plane can be defined by points, vectors, straight lines, or axes.

Figure 7:
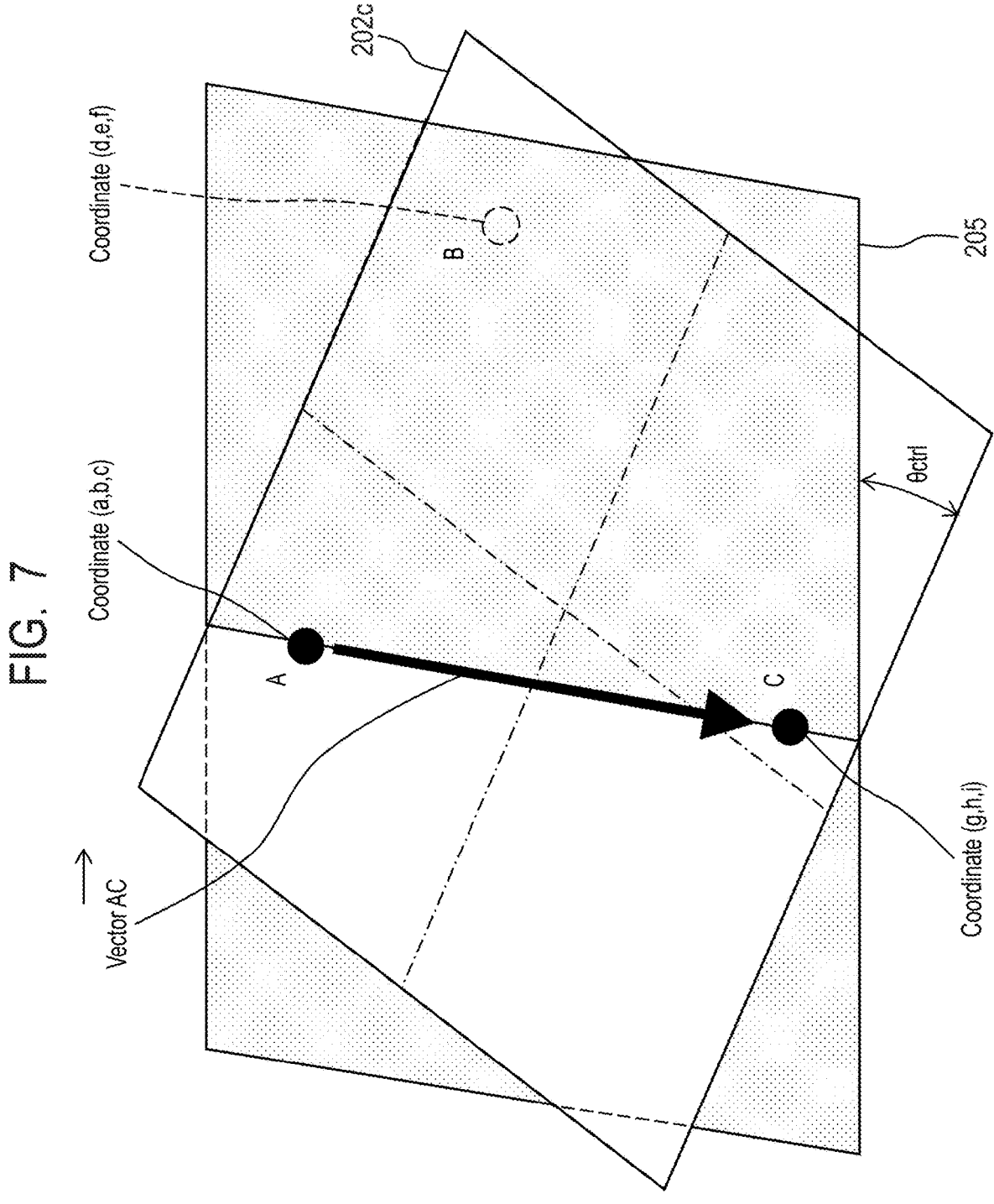
FIG. 7 is a schematic diagram illustrating the object plane (202c) and the rotating object plane (205).

However, the photographer cannot determine the object plane 202c from the beginning. To obtain a desired degree of blurring, the degree of blurring may be determined while mainly checking the live view video on the display unit 60 and sometimes changing the degree of blurring. Based on such photographing, a method of geometrically defining the object plane 202c will be described with reference to FIG. 7. FIG. 7 is schematic diagram illustrating the object plane 202c and a rotating object plane 205.

FIG. 7 illustrates the rotating object plane 205 (focal plane) being set when the photographer sets a desired object plane 202c. On the rotating object plane 205, the spatial coordinate point A and the spatial coordinate point C are instructed by the photographer, these two points are in focus, and the spatial coordinate point B is out of focus. In the camera system 100 according to the present exemplary embodiment, if three points to be focused are determined, the photographer can instruct the camera system 100 to construct the object plane 202c as described above, and the camera system 100 can capture an image by focusing on a desired object.

However, for example, in so-called "inverse tilt photographing (miniature photographing)" in which a street or a person is photographed by blurring the upper and lower sides of a photograph, the photographer searches and determines a photographing condition while confirming the degree of blurring as to where to focus and where to blur. Therefore, as described above, the vector AC is defined by the spatial coordinate point A and the spatial coordinate point C instructed by the photographer. Then, the photographer instructs to rotate the rotating object plane 205 in the θctrl direction with the vector AC as the rotation axis.

On the other hand, it is relatively easy for the photographer to instruct a vector serving as a rotation axis for rotating the rotating object plane 205 under the condition that the object does not move, the amount of movement is small, or the speed is low as in the above-described "object shot" or miniature photographing. On the other hand, it is difficult for the photographer to instruct the spatial coordinates of a vehicle moving at a predetermined speed, such as an airplane, an automobile, or a bicycle, as well as a train.

The camera CPU 50 (object recognition unit) of the camera system 100 according to the present exemplary embodiment recognizes feature points of an object from a captured image stored (acquired) in the object storage unit 26 and extracts the feature points as spatial coordinates, then it serves as an object recognition system. It is also possible to select a plurality of vectors AC from the obtained spatial coordinates depending on the characteristics of the subject. The camera system 100 includes a camera CPU 50 and a display unit 60 for a rotation axis selection process that displays the vector on the display unit 60 together with the captured image. The photographer can rotate the object plane around an axis (spatial axis) defined from the feature point by performing a predetermined operation, such as a swipe, or a flick, on the display unit 60 having a touch function (focal plane rotation mechanism). That is, the camera system 100 functions as a control apparatus that includes a camera CPU 50 that can recognize feature points of the object, and a focal plane rotation mechanism that rotate the focal plane around an axis defined from the feature points, and functions as a control apparatus that in-focus range can be adjusted by rotating the focusing plane. The display unit 60 can display the axis defined from the feature points of the object. The photographer can adjust the tilt effect and the in-focus range (blurring range) of the object while viewing the display unit 60, thereby realizing photographing in a desired blurring range. According to the present disclosure, there is provided a control apparatus and imaging apparatus that can set a desired tilt effect and in-focus range (blurring range) even if the optical system is capable of obtaining the tilt effect in any directions on the screen, up, down, left, right, and diagonally. Next, a specific example of the photographing method will be explained with reference to FIG. 8.

Figure 8:
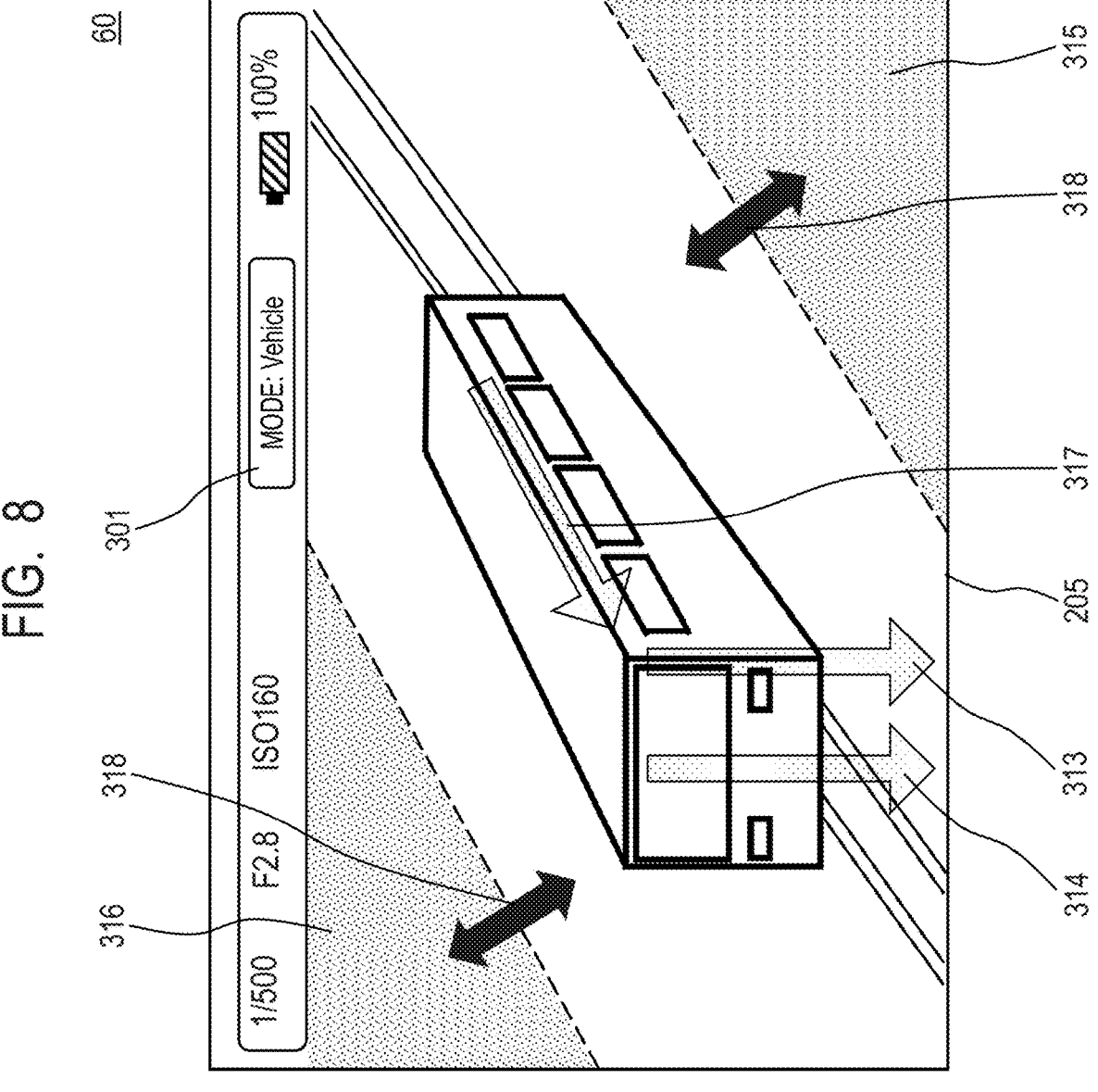
FIG. 8 is a schematic diagram of the display unit (60) in a case where the object is a train.

FIG. 8 is a schematic diagram of the display unit 60 in a case where the shooting mode 301 is set as a mode for imaging a "vehicle" and, for example, a train moves as an object. And details of the shooting mode 301 will be described later. As for the rotation axis 317, a corner of the roof along the traveling direction of the train as the feature point is selected as the object plane rotation axis. The rotation axis 317 is recognized as a spatial coordinate (spatial position) whose feature point is the point closest to the corner, and is defined by a vector that moves through the spatial coordinate. Further, the rotation axis 317 may be a line (third line) connecting the closest spatial position and the farthest spatial position of at least one subject. Since the image pickup unit 58 (acquisition unit) such as a dual pixel CMOS AF can recognize a space, the image pickup unit 58 serves to acquire a feature point as a spatial position.

Further, a point closest to a corner portion of the forefront surface serving as the "face" of the train as the feature point is recognized as the spatial coordinates (spatial position) serving as the feature point, and is similarly selected as the rotation axis 313 serving as the object plane rotation axis. In addition, a virtual axis (first line) along the gravity direction of the center of gravity of the forefront surface which is the "face" of the train as the feature point is similarly selected as the rotation axis 314 which is the object plane rotation axis. In the imaging of the present embodiment, the plurality of rotation axes 313, 314, and 317 are simultaneously selected and displayed on the display unit 60. Alternatively, a plurality of rotation axes 313, 314, and 317 may be defined and displayed on the display unit 60 so that least one rotation axis can be selected. Although the vehicle such as a train to be photographed is moving, the movement is tracked by the above-described object recognition system, and the rotation axes 313, 314, and 317 are continuously displayed. Note that the display unit 60 may be caused to function as a notification unit so as to light up and display the rotation axes 313, 314, and 317 and notify that the rotation axes 313, 314, and 317 have been selected. Further, a sound may be generated for notification.

The camera system 100 of the present embodiment can provide a such a rotation axis selection process is installed in the camera CPU 50, and the photographer selects a desired rotation axis from these rotation axes. In the present embodiment, as described above, the display unit 60 is a touch panel having a touch panel function, and thus the photographer performs a touch operation to select at least one desired rotation axis from the rotation axes 313, 314, and 317 by touch operation. For example, when the rotation axis 317 is selected by a touch operation, the rotating object plane 205 is moved (rotated) around the selected rotation axis 317 so as to be able to focus on the selected rotation axis, and as a result, the blurring occurs in the blurring range 315 and 316. This is realized by combining a tilting operation in which the object plane is tilted by position control of the sixth lens unit 6 and the eighth lens unit 8, and focusing control by moving the second lens unit 2 in the optical axis direction. That is, the rotating the rotating object plane 205 can be rotated around the rotation axis 313, 314, and 317 defined from the feature points by the TS driving unit 25 or the TS driving unit 25 and the focus driver 13A. Further, the TS driving unit 25 or the TS driving unit 25 and the focus driver 13A are controlled based on information for rotating the rotating object plane 205 around an axis defined from the feature points of the subject. According to the present disclosure, it is possible to provide an optical apparatus that can set a desired tilt effect and an in-focus range (blurring range).

When the rotating object plane 205 moves and focuses on the rotation axis 317, at the rotation axis 317, that is, a blurring corresponding to the distance occurs at the upper left (blurring range 316) of the screen of the display unit 60 in a distant view from the train and at the lower right (blurring range 315) of the screen in a close view. A guide arrow 318 indicates a direction in which the blurring range changes, and the photographer can change the blurring range by performing a touch operation, a so-called "swipe", along the guide arrow 318. The guide arrow 318 functions as a guide in the "swipe" direction, but the blurring range can be changed by checking the blurring range on the display unit 60 without displaying the guide arrow 318. Further, a function of switching between display and non-display may be provided. Although a dotted line is illustrated in FIG. 8 to represent the blurring range in this embodiment, the operation can be performed without displaying the dotted line, and a function of switching the dotted line or another display method may be used.

Figure 9:
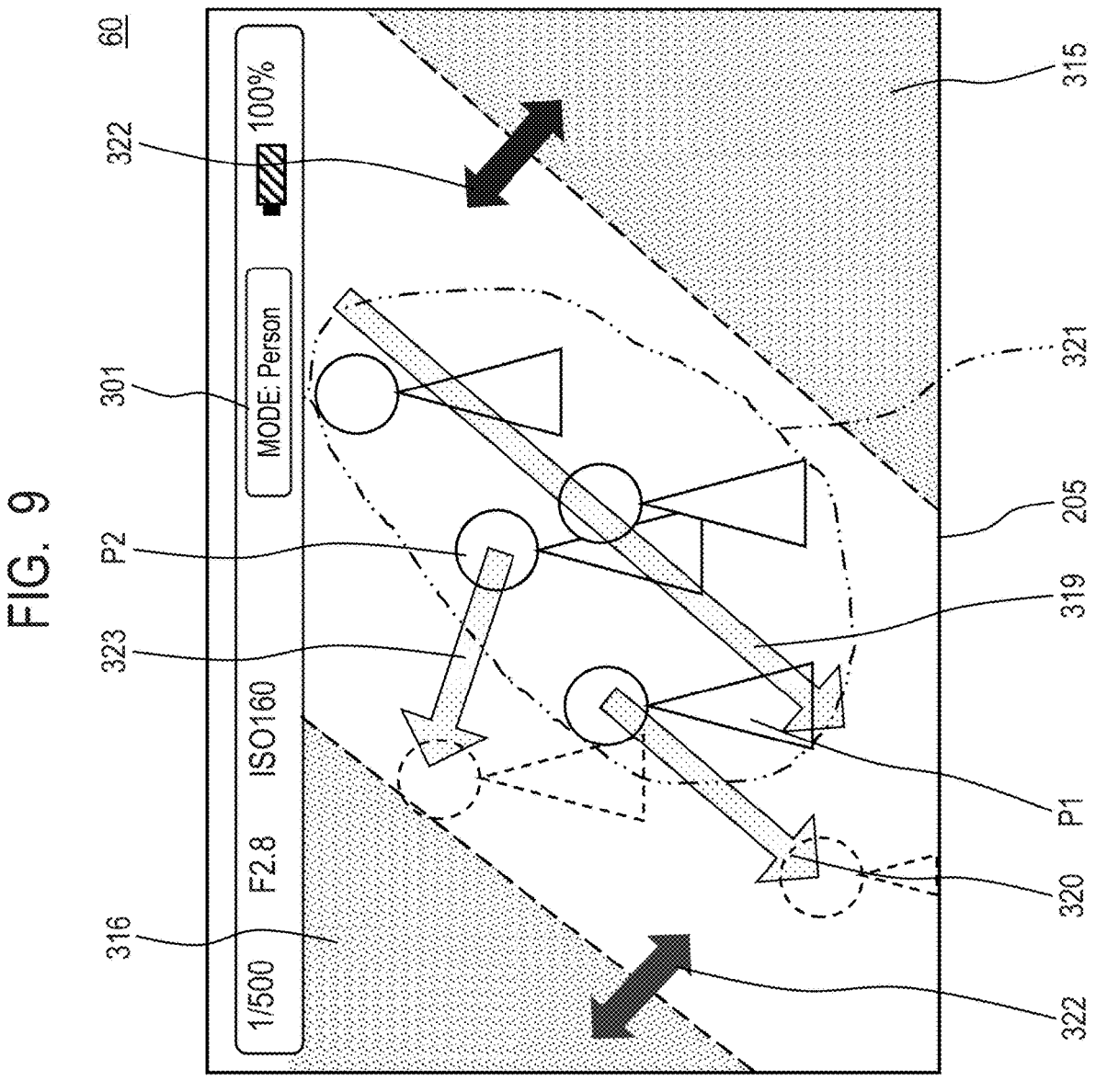
FIG. 9 is a schematic diagram of the display unit (60) when the object is a person.

FIG. 9 is a schematic diagram of the display unit 60 in a case where the shooting mode 301 is set as a mode for photographing a "person", and people as objects move in a group, for example, in a foot race of an athletic meet. Even if the object in the shooting mode 301 is a "person", the rotation axis of the rotating object plane 205 can be selected by recognizing feature points of the object as in the case of the "vehicle" described with reference to FIG. 8. An area 321 indicated by a two-dot chain line indicates an area on the imaging plane when persons are recognized as a group.

The rotation axis 319 (second line) is selected from the center of gravity of the area 321 and the direction of movement thereof. Note that there is also a method of defining and selecting the rotation axis 319 by a vector connecting the closest point (spatial position as a feature point) and the farthest point (spatial position as a feature point) in the group. Further, the rotation axis 319 may be a line (third line) connecting the closest spatial position and the farthest spatial position of at least one object. For example, when the person P1 moves within a unit time, the rotation axis 320 is selected from one feature point (spatial position) of the eyes, face, or shape of at least one subject and the direction of movement thereof. Further, the rotation axis 320 may be a line (fourth line) connecting the spatial positions moved in the unit time. Since the rotation axes 319 and 320 are selected from persons of the same group, they are substantially in the same direction. However, the group of persons does not always move in the same direction. Therefore, there is also a rotation axis 323 in which the direction in which the person P2 deviated from the group is selected in the same group as the rotation axis 320. Further, the rotation axis 323 may be a line (fourth line) connecting spatial positions moved per unit time. A guide arrow 322 indicates a direction in which the blurring changes when the image is rotated about the rotation axis 319, and swiping along the guide arrow 322, the blurring ranges 315 and 316 can be set to desired ranges.

Note that there is a method of instructing θctrl other than the touch instruction of the display unit 60 described above. For example, the line of sight input using an EVF, a rotation operation of the diaphragm operation ring 19, or a method using a button or a dial (not illustrated) may be used. In this embodiment the listing of all of them is omitted, but the instruction method is not limited. Any method may be used if it can instruct θctrl. Further, there is also a method of automatically determining in accordance with the set shooting mode of the camera, but details thereof will be omitted.

As described above, in FIG. 8, a train is used as an example of the object, and in FIG. 9, a person is used as an example of the object, however, for example, even when a bicycle race is photographed by switching the shooting mode, it is possible to perform photographing in the same process of selecting the rotation axis, determining the rotation axis, and determining the blurring range. Note that the object may be birds, horses, or insects, and this embodiment can be implemented as long as object recognition can be performed to extract a predetermined feature point.

FIG. 10 is a list of the shooting modes 301. As described above, the camera system 100 of the present embodiment has various shooting modes 301. In particular, as the shooting mode 301 for recognizing a feature point of the present embodiment in which tilt shooting can be performed, there are "person" in which an object is a person, "vehicle priority" in which an object is a vehicle, and "animal priority" in which an object is an animal. Further, there is a shooting mode 301 of "automatic" which is easy to use for a photographer who wants to photograph without limiting an object, and a feature point is extracted by the above-described object recognition, and a rotation axis appropriate for the photographer is selected. In each shooting mode, object/spot detection which is likely to be a feature point of each object is also defined, and an algorithm which is likely to select a rotation axis is used for each shooting mode, but details thereof will be omitted.

Further, in the present embodiment, there is a shooting mode 301 called "pattern priority", which is a mode in which an object pattern to be frequently photographed is stored in the image recording unit 59 of the camera body 102, a storage unit (not illustrated), or the like, and the pattern is preferentially selected as a feature point. By utilizing this "pattern priority", it is possible to easily focus on an object preferred by the photographer and to perform photographing with a desired blurring range.

Although the preferred embodiments of the present disclosure have been described above, the present disclosure is not limited to these embodiments and modifications, and various modifications and changes can be made within the scope of the gist of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-089101, filed May 30, 2023, which is hereby incorporated by reference herein in its entirety.

What is claimed is:

1. An imaging apparatus comprising:
an optical apparatus including a plurality of optical members and configured to image an object;
an image pickup unit configured to capture an image formed by the optical apparatus;
a tilt driving unit configured to tilt a focal plane by driving at least one of the plurality of optical members or the image pickup unit;
a focus driving unit configured to drive another optical member of the plurality of optical members to change an in-focus position; and
an object recognition unit configured to recognize a feature point of the object;

wherein the focal plane is rotatable around an axis defined from the feature point by the tilt driving unit.

2. The imaging apparatus according to claim 1, wherein a plurality of the axes is defined, and at least one of the axes is selectable.

3. The imaging apparatus according to claim 2, further comprising a notification unit configured to notify that the axis is selected.

4. The imaging apparatus according to claim 3, wherein the notification unit is a display unit that displays an image to be captured, and wherein at least one of the axes is displayed on the display unit.

5. The imaging apparatus according to claim 4, wherein the display unit is a touch panel, and at least one of the axes is selectable by a touch operation.

6. The imaging apparatus according to claim 5, wherein the focal plane can be rotated around the axis selected by the touch operation.

7. The imaging apparatus according to claim 1, further comprising an acquisition unit configured to acquire the feature point as a spatial position.

8. The imaging apparatus according to claim 7, wherein the axis is a first line which is a gravity direction of the spatial position, or a second line which is a line connecting two spatial positions, or a third line which connects a spatial position at a shortest distance and a spatial position at a longest distance of the object, or a fourth line which connects spatial positions moved in a unit time.

9. The imaging apparatus according to claim 7, wherein the spatial position is defined by at least one of an eye, a face, and a shape of the object.

10. The imaging apparatus according to claim 1, comprising an object storage unit configured to store a position of the object, wherein the object recognition unit recognizes the feature point of the object stored in the object storage unit.

11. The imaging apparatus according to claim 1, wherein the focal plane is rotatable around the axis defined from the feature point by the tilt driving unit and the focus driving unit.

12. The imaging apparatus according to claim 1, wherein the optical apparatus is detachably attached to the image pickup unit.

13. An optical apparatus comprising:

a plurality of optical members;

a tilt driving unit configured to tilt a focal plane by driving at least one of the plurality of optical members; and a focus driving unit configured to drive another optical member of the plurality of optical members to change an in-focus position;

wherein the tilt driving unit is controlled based on information for rotating the focal plane around an axis defined from a feature point of an object.

14. A control apparatus comprising:

an object recognition unit configured to be capable of recognizing a feature point of an object; and a focal plane rotation mechanism configured to rotate a focal plane around an axis defined by the feature points;

wherein an in-focus range is adjustable by rotating the focal plane.

15. The control apparatus according to claim 14, further comprising a display unit configured to display an axis defined from the feature point of the object.

* * * * *